United States Patent
Kwone et al.

(10) Patent No.: US 12,473,647 B2
(45) Date of Patent: Nov. 18, 2025

(54) COMPOSITION FOR DEPOSITING ANTIMONY-CONTAINING THIN FILM AND METHOD FOR MANUFACTURING ANTIMONY-CONTAINING THIN FILM USING THE SAME

(71) Applicant: DNF CO., LTD., Daejeon (KR)

(72) Inventors: Yong Hee Kwone, Daejeon (KR); Young Jae Im, Daejeon (KR); Sang Yong Jeon, Daejeon (KR); Tae Seok Byun, Daejeon (KR); Sang Chan Lee, Daejeon (KR); Sang Ick Lee, Daejeon (KR)

(73) Assignee: DNF CO., LTD., Daejeon (KR)

( * ) Notice: Subject to any disclaimer, the term of this patent is extended or adjusted under 35 U.S.C. 154(b) by 151 days.

(21) Appl. No.: 18/146,894

(22) Filed: Dec. 27, 2022

(65) Prior Publication Data

US 2023/0203655 A1 Jun. 29, 2023

(30) Foreign Application Priority Data

Dec. 28, 2021 (KR) .................. 10-2021-0189543
Dec. 2, 2022 (KR) .................. 10-2022-0166443

(51) Int. Cl.
| | |
|---|---|
| *C23C 16/455* | (2006.01) |
| *C07F 9/90* | (2006.01) |
| *C23C 16/40* | (2006.01) |

(52) U.S. Cl.
CPC .......... *C23C 16/45553* (2013.01); *C07F 9/90* (2013.01); *C23C 16/40* (2013.01); *C23C 16/45538* (2013.01)

(58) Field of Classification Search
CPC .................................................. C07F 9/90
See application file for complete search history.

(56) References Cited

U.S. PATENT DOCUMENTS

| | | | |
|---|---|---|---|
| 2012/0171378 A1* | 7/2012 | Xiao | C23C 16/45553 427/255.35 |
| 2015/0021537 A1 | 1/2015 | Xie et al. | |
| 2017/0140918 A1* | 5/2017 | Matero | H01L 21/0332 |

FOREIGN PATENT DOCUMENTS

| | | | | |
|---|---|---|---|---|
| JP | 2009076876 A | | 4/2009 | |
| JP | 2012256886 A | | 12/2012 | |
| JP | 2013084959 A | | 5/2013 | |
| KR | 20090091107 A | | 8/2009 | |
| KR | 20200144580 A | | 12/2020 | |
| WO | WO-2008057616 A2 * | | 5/2008 | ........... C07C 251/08 |

OTHER PUBLICATIONS

CAS Abstract and Indexed Compounds, H. Meinema et al., 6 Inorganic and Nuclear Chemistry Letters, 241-243 (1970) (Year: 1970).*
H. Meinema et al., 6 Inorganic and Nuclear Chemistry Letters, 241-243 (1970) (Year: 1970).*
CAS Registry No. 2794176-15-9 (Entered STN: Jul. 19, 2022) (Year: 2022).*
J. Stevens et al., 115 Inorganica Chimica Acta, 197-201 (1986) (Year: 1986).*
Krommes, P. et al., "Metallorganische diazoverbindungen : VIII. Reaktionen von arsen- und antimonamiden mit diazoessigsäureathylester," Journal of Organometallic Chemistry, vol. 97, No. 1, Sep. 9, 1975, 7 pages. (Submitted with English Abstract).
Meiema, H. et al., "Preparation and Properties of Die TH Ylaminoorganoantimon Y(III) Derivatives," Inorganic and Nuclear Chemistry Letters, vol. 6, No. 2, Feb. 1970, 3 pages.
Krommes, P. et al., "Metallorganische diazoverbindungen : VIII. Reaktionen von arsen- und antimonamiden mit diazoessigsäureathylester," Journal of Organometallic Chemistry, vol. 97, No. 1, Sep. 9, 1975, 6 pages. (Document Includes English Abstract).
Stevens, J. et al., "Synthesis and 121Sb Mössbauer Study of a Number of Organoantimony(III) Compounds Containing Antimony-Main Group V Element Bonds," Inorganica Chimica Acta, vol. 115, No. 2, May 15, 1986, 5 pages.

* cited by examiner

*Primary Examiner* — Alexander R Pagano
(74) *Attorney, Agent, or Firm* — McCoy Russell LLP

(57) ABSTRACT

Provided are a composition for depositing an antimony-containing thin film including a novel antimony compound which may be useful as a precursor of an antimony-containing thin film and a method for manufacturing an antimony-containing thin film using the same.

14 Claims, 3 Drawing Sheets

COMPOSITION FOR DEPOSITING ANTIMONY-CONTAINING THIN FILM AND METHOD FOR MANUFACTURING ANTIMONY-CONTAINING THIN FILM USING THE SAME

CROSS-REFERENCE TO RELATED APPLICATIONS

This application claims priority under 35 U. S.C. § 119 to Korean Patent Application No. 10-2021-0189543, filed on Dec. 28, 2021, and Korean Patent Application No. 10-2022-0166443, filed on Dec. 2, 2022, in the Korean Intellectual Property Office, the disclosure of which is incorporated herein by reference in its entirety.

TECHNICAL FIELD

The following disclosure relates to a composition for depositing an antimony-containing thin film including a novel antimony compound as a precursor of an antimony-containing thin film and a method for manufacturing an antimony-containing thin film using the same.

BACKGROUND

An antimony (Sb)-containing thin film may be used for an insulation layer, a diffusion-preventing layer, a hard mask, an etch stop layer, a seed layer, a spacer, an intermetallic dielectric material and protective film layer, an antireflection layer, and the like due to its excellent thin film properties, and the application field is increasingly diversified. In particular, an antimony-containing thin film has excellent etching resistance and is gaining attention as a next-generation material of an EUV photolithography process hard mask.

Meanwhile, due to the high performance of a device, a semiconductor circuit is miniaturized with each passing year. Due to the miniaturization and the increased aspect ratio of a semiconductor circuit, and the diversification of a device material, a technology to form an ultrafine thin film having a uniform and small thickness even at a low temperature and excellent electrical properties and etching resistance is demanded.

However, a conventional antimony-containing thin film precursor involves a high-temperature process, so that it is difficult to apply it to a plastic substrate, when a process temperature is to be lowered, may have decreased thin film deposition rate and thin film purity, and has limitations of insufficient step coverage, etching resistance, and physical and electrical properties.

RELATED ART DOCUMENTS

Patent Documents (Patent Document 1) Korean Patent Laid-Open Publication No. 10-2009-0091107 (May 15, 2008)

SUMMARY

An embodiment of the present invention is directed to providing a composition for forming an antimony-containing thin film which may provide a high-quality antimony-containing thin film.

Another embodiment of the present invention is directed to providing a method for manufacturing an antimony-containing thin film which allows deposition of a thin film with a high thin film deposition rate even under mild reaction conditions and may produce a high-quality antimony-containing thin film in a high purity.

Still another embodiment of the present invention is directed to providing an antimony compound having a novel structure which may be useful as a precursor of an antimony-containing thin film.

In one general aspect, a composition for forming an antimony-containing thin film which may produce a high-quality antimony-containing thin film is provided, and the composition for depositing an antimony-containing thin film according to an embodiment of the present invention includes an antimony compound represented by the following Chemical Formula 1:

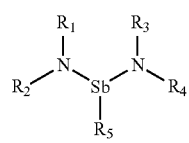

Chemical Formula 1 wherein $R_1$ to $R_5$ are independently of one another linear or branched (C1-C7) alkyl.

More preferably, in Chemical Formula 1, $R_1$ to $R_4$ may be independently of one another linear (C1-C7) alkyl, and $R_5$ may be branched (C3-C7) alkyl.

More preferably, the antimony compound represented by Chemical Formula 1 may be represented by the following Chemical Formula 2:

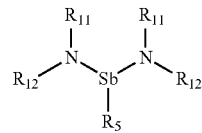

Chemical Formula 2 wherein $R_{11}$ and $R_{12}$ are independently of each other linear or branched (C1-C7) alkyl; and $R_5$ is branched (C3-C7)alkyl.

More preferably, in Chemical Formula 2, $R_5$ may be branched (C3-C5) alkyl.

The antimony compound according to an embodiment may be selected from the following compounds, but is not limited thereto:

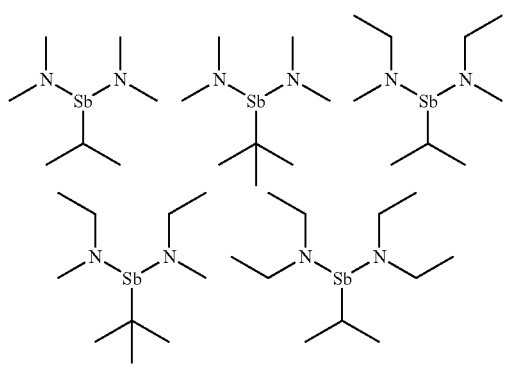

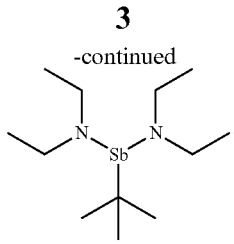

In another general aspect, a method for manufacturing an antimony-containing thin film includes:

a) maintaining a temperature of a substrate mounted in a chamber at 30 to 500° C.;

b) bringing the substrate into contact with the composition for depositing an antimony-containing thin film according to an embodiment of the present invention to adsorb the composition onto the substrate; and c) injecting a reaction gas into the substrate onto which the composition for depositing an antimony-containing thin film is adsorbed to form an antimony-containing thin film.

The reaction gas may include oxygen ($O_2$), ozone ($O_3$), oxygen plasma, hydrogen ($H_2$), hydrogen plasma, water ($H_2O$), hydrogen peroxide ($H_2O_2$), nitrogen dioxide ($NO_2$), nitrogen monoxide (NO), nitrous oxide ($N_2O$), ammonia ($NH_3$), carbon dioxide ($CO_2$), formic acid (HCOOH), acetic acid ($CH_3COOH$), anhydrous acetic acid (($CH_3CO)_2O$), or a combination thereof.

The reaction gas may be supplied after being activated by generating plasma at 50 to 1,000 W.

In still another general aspect, a novel compound which may be used as a precursor of a high-quality antimony-containing thin film is provided, and the compound includes: an antimony compound represented by the following Chemical Formula 1:

Chemical Formula 1

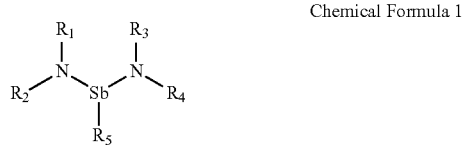

wherein $R_1$ to $R_5$ are independently of one another linear or branched (C1-C7) alkyl.

More preferably, the antimony compound according to an embodiment may be represented by the following Chemical Formula 2:

Chemical Formula 2

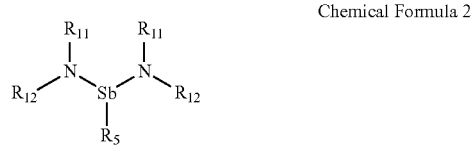

wherein $R_{11}$ and $R_{12}$ are independently of each other linear or branched (C1-C7) alkyl; and $R_5$ is branched (C3-C7)alkyl.

Other features and aspects will be apparent from the following detailed description, the drawings, and the claims.

DETAILED DESCRIPTION OF EMBODIMENTS

Figure 1:
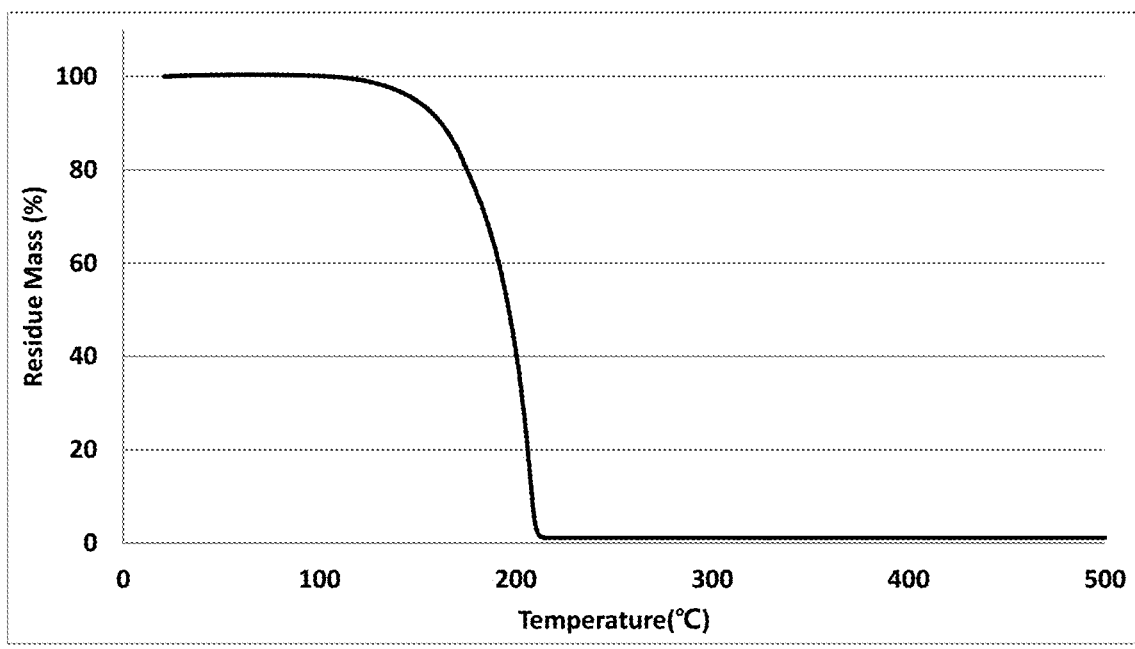
FIG. 1 is results of TGA analysis of t-butylbis(dimethylamino)antimony prepared in Preparation Example 1.

Hereinafter, the present invention will be described in detail so as to be easily practiced by a person skilled in the art to which the present invention pertains. However, the present invention may be implemented in various different forms and is not limited to the implementations described herein. In addition, it is not intended to limit the protection scope defined in the claims.

In addition, technical terms and scientific terms used in the description of the present invention have the general meaning understood by a person skilled in the art unless otherwise defined, and description for the known function and configuration obscuring the present invention will be omitted in the following description.

The numerical range used in the present specification includes all values within the range including the lower limit and the upper limit, increments logically derived in a form and span in a defined range, all double limited values, and all possible combinations of the upper limit and the lower limit in the numerical range defined in different forms. Unless otherwise defined in the specification of the present invention, values which may be outside a numerical range due to experimental error or rounding of a value are also included in the defined numerical range.

Unless otherwise particularly defined in the present invention, "comprising" any elements will be understood to imply further inclusion of other elements rather than the exclusion of any other elements. In addition, the singular form used in the specification and claims appended thereto may be intended to also include a plural form, unless otherwise indicated in the context.

The term "alkyl" in the present specification is an organic radical derived from an aliphatic hydrocarbon by removal of one hydrogen, and may include both linear and branched alkyls. The alkyl may have 1 to 7, specifically 1 to 5, and more specifically 1 to 4 carbon atoms. The linear alkyl may include, as an example, methyl, ethyl, n-propyl, n-butyl, n-pentyl, n-hexyl, n-heptyl, and the branched alkyl may include isopropyl, sec-butyl, isobutyl, tert-butyl, isopentyl, 2-methylhexyl, 3-methylbutyl, 2-methylpentyl, 3-methylpentyl, 4-methylpentyl, 2-methylhexyl, 3-methylhexyl, 2-methylpentyl, 3-methylpentyl, 4-methylpentyl, 4-methylhexyl, 5-methylhexyl, 2,3-dimethylbutyl, 2,3-dimethylpentyl, 2,4-dimethylpentyl, and the like, but they are not limited thereto.

Hereinafter, the present invention will be described in detail.

The composition for depositing an antimony-containing thin film according to an embodiment of the present invention includes a precursor compound having a specific structure, and may provide a high-quality antimony-containing thin film.

Specifically, the precursor compound according to an embodiment may be an antimony compound represented by the following Chemical Formula 1:

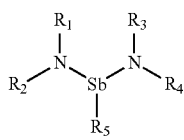

Chemical Formula 1 wherein $R_1$ to $R_5$ are independently of one another linear or branched (C1-C7) alkyl.

Without being bound to a certain theory, the antimony compound represented by Chemical Formula 1 has the structural characteristics as described above, for example, has two amine groups and one alkyl group as a substituent, and thus, may be present in a liquid state and have excellent reactivity and volatility. Accordingly, the composition for depositing an antimony-containing thin film according to an embodiment of the present invention may be easily stored and handled, allows deposition of a thin film with a high thin film deposition rate even at low temperature conditions, and may provide a high-quality antimony-containing thin film having high purity and excellent durability.

In addition, the antimony-containing thin film manufactured from the composition for forming an antimony-containing thin film according to an embodiment is very advantageous for forming a feature-sized pattern smaller than a chemically amplified resist (CAR) which is currently used. Though chemically amplified resist (CAR) has high sensitivity, O, F, S, and C which are typical elemental makeup thereof make the photoresists too clear in a specific wavelength, and as a result, decrease sensitivity.

In addition, chemically amplified resist (CAR) may have difficulty in forming a pattern due to roughness issues in small feature sizes, and a photo speed is decreased partially due to the nature of the acid catalyst process, and thus, a line edge roughness (LER) is increased. However, the antimony compound according to an exemplary embodiment of the present invention has excellent light absorption rate and light emission effect to EUV, and thus, may be very useful as a hard mask used in an EUV photolithography process.

Specifically, in Chemical Formula 1 according to an exemplary embodiment of the present invention, $R_1$ to $R_4$ may be independently of one another linear (C1-C7) alkyl, linear (C1-C5) alkyl, or linear (C1-C3) alkyl, and for example, may be methyl, ethyl, or n-propyl. Specifically, $R_1$ and $R_3$ may be the same and $R_2$ and $R_4$ may be the same, and more specifically, $R_1$ to $R_4$ may be the same.

In addition, in Chemical Formula 1 according to an exemplary embodiment of the present invention, $R_5$ may be branched (C3-C7) alkyl, and for example, $R_5$ may be isopropyl, sec-butyl, isobutyl, tert-butyl, or isopentyl.

The antimony compound represented by Chemical Formula 1 may be, for example, represented by the following Chemical Formula 2:

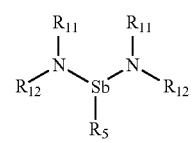

Chemical Formula 2 wherein $R_{11}$ and $R_{11}$ are independently of each other linear or branched (C1-C7) alkyl; and $R_5$ is branched (C3-C7)alkyl.

Specifically, in Chemical Formula 2, $R_{11}$ and $R_{11}$ may be independently of each other linear (C1-C7) alkyl, specifically linear (C1-C5) alkyl, and more specifically linear (C1-C3) alkyl, and for example, may be methyl, ethyl, or n-propyl.

In addition, in Chemical Formula 2, $R_5$ may be branched (C3-C7) alkyl, and for example, may be isopropyl, sec-butyl, isobutyl, tert-butyl, or isopentyl.

Since the branched alkyl group of $R_5$ as described above is introduced to the antimony compound represented by Chemical Formula 1 according to an embodiment, it has better reactivity and thermal stability as a precursor for depositing an antimony-containing thin film, thereby manufacturing a higher-quality thin film.

The antimony compound represented by Chemical Formula 1 may be selected from the following compounds, but is not limited thereto:

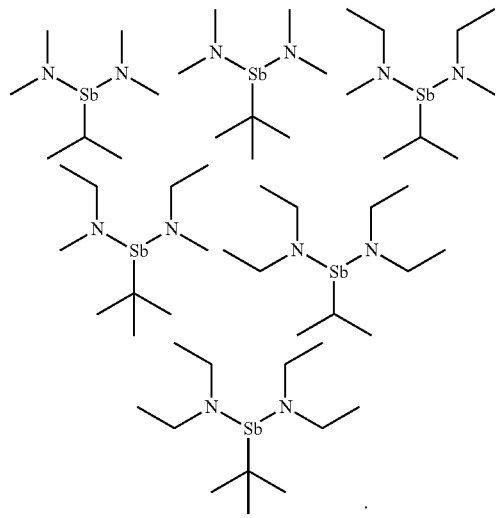

The composition for depositing an antimony-containing thin film according to an embodiment necessarily includes the antimony compound represented by Chemical Formula 1 as a precursor for depositing a thin film, and the content of the compound represented by Chemical Formula 1 in the composition may be within a range which may be recognized by a person skilled in the art considering the film forming conditions of the thin film, the thickness of the thin film, the characteristics of the thin film, the use of the thin film, and the like.

In addition, another embodiment of the present invention provides a method for manufacturing an antimony-containing thin film, using the composition for depositing an antimony-containing thin film.

The method for manufacturing an antimony-containing thin film according to an embodiment may produce a high-quality antimony-containing thin film with a high deposition rate even at a low temperature and a low power, since a composition including the antimony compound represented by Chemical Formula 1 as a precursor is used. The antimony-containing thin film may be used for various purposes, for example, an insulating film, a diffusion-preventing film, a hard mask, an etch stop layer, a seed layer, a spacer, an anti-reflection layer, an intermetallic dielectric material, and a protective film layer in the manufacture of electronic devices, and preferably, may be used as a hard mask used in an EUV photolithography process, but is not limited thereto.

In the method for manufacturing an antimony-containing thin film according to an embodiment, the method for depositing a thin film is not particularly limited as long as it is commonly used in the art, but, for example, atomic layer deposition (ALD), chemical vapor deposition (CVD), metal organic chemical vapor deposition (MOCVD), low pressure chemical vapor deposition (LPCVD), plasma enhanced chemical vapor deposition (PECVD), or plasma enhanced atomic layer deposition (PEALD) may be used, and specifically, ALD or CVD may be used, but the present invention is not limited thereto.

The method for manufacturing an antimony-containing thin film according to an embodiment may include:

a) maintaining a temperature of a substrate mounted in a chamber at 30 to 500° C.;

b) bringing the substrate into contact with the composition for depositing an antimony-containing thin film according to an embodiment of the present invention to adsorb the composition onto the substrate; and c) injecting a reaction gas into the substrate onto which the composition for depositing an antimony-containing thin film is adsorbed to form an antimony-containing thin film.

More specifically, the method for manufacturing an antimony-containing thin film may include:

a) maintaining a temperature of a substrate mounted in a chamber at 30 to 500° C.;

b) bringing the substrate into contact with the composition for depositing an antimony-containing thin film according to an embodiment of the present invention to adsorb the composition onto the substrate;

c) purging a residual composition for deposition and a by-product;

d) injecting a reaction gas into the substrate onto which the composition for depositing an antimony-containing thin film is adsorbed to form an antimony-containing thin film; and e) purging a residual reaction gas and a by-product.

Though the substrate is not particularly limited as long as it is commonly used in the art, it may be, for example, a substrate including one or more semiconductor materials of Si, Ge, SiGe, GaP, GaAs, SiC, SiGeC, InAs and InP; a silicon on insulator (SOI) substrate; a quartz substrate; or a glass substrate for display; a flexible plastic substrate such as polyimide (PI), polyethylene terephthalate (PET), polyethylene naphthalate (PEN), polymethyl methacrylate (PMMA), polycarbonate (PC), polyethersulfone (PES) and polyester.

In addition, the antimony-containing thin film may be formed directly on the substrate, but also, a plurality of conductive layers, dielectric layers, insulating layers, or the like may be further formed between the substrate and the antimony-containing thin film.

As an example, the temperature of the substrate may be 30 to 500° C., 30 to 300° C., or 50 to 200° C., but is not limited thereto.

As an example, the reaction gas may be supplied after being activated by generating plasma at 50 to 1,000 W, 100 to 800 W, or 400 to 600 W.

That is, in the method for manufacturing an antimony-containing thin film according to an embodiment, the thin film may be effectively manufactured even at a low temperature with low plasma generation, by using the compound of Chemical Formula 1 as a precursor.

The reaction gas may remove the ligand of the antimony compound included in the composition for depositing an antimony-containing thin film to form a (Sb-O) atomic layer.

The kind of reaction gas is not particularly limited as long as it is commonly used in the art, but as an example, may be oxygen ($O_2$), ozone ($O_3$), oxygen plasma, hydrogen ($H_2$), hydrogen plasma, water ($H_2O$), hydrogen peroxide ($H_2O_2$), nitrogen dioxide ($NO_2$), nitrogen monoxide (NO), nitrous oxide ($N_2O$), ammonia ($NH_3$), carbon dioxide ($CO_2$), formic acid (HCOOH), acetic acid ($CH_3COOH$), anhydrous acetic acid (($CH_3CO)_2O$), or a combination thereof. A gas for purging may be nitrogen ($N_2$), argon (Ar), helium (He), or a combination thereof.

In the method for manufacturing an antimony-containing thin film according to an embodiment, deposition conditions may be adjusted depending on the structure or thermal properties of the thin film to be desired, and the decomposition conditions according to an embodiment may be, for example, an input flow rate of the composition for depositing antimony-containing thin film, a reaction gas, an input flow rate of carrier gas, pressure, RF power, a substrate temperature, and the like. As a non-limiting example, the input flow rate of the composition for depositing an antimony-containing thin film may be 10 to 1000 cc/min, the carrier gas may be 10 to 1000 cc/min, the flow rate of the reaction gas may be 1 to 1500 cc/min, the pressure may be 0.5 to 10 torr, and the RF power and the substrate temperature may be as described above.

In addition, another embodiment of the present invention provides a novel compound which may be used as a precursor of the antimony-containing thin film. Specifically, the novel compound may be an antimony compound represented by the following Chemical Formula 1:

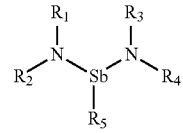

Chemical Formula 1 wherein $R_1$ to $R_5$ are independently of one another linear or branched (C1-C7) alkyl.

Without being bound to a certain theory, the antimony compound represented by Chemical Formula 1 has the structural characteristics as described above, for example, has two amine groups and one alkyl group as a substituent, and thus, may be present in a liquid state at room temperature and have excellent reactivity, volatility, and thermal stability. Accordingly, the compound represented by Chemical Formula 1 is easily stored and handled, and when it is applied to the composition for depositing an antimony-containing thin film, a high-purity thin film may be manufactured with an excellent thin film deposition speed.

Specifically, $R_1$ to $R_4$ may be independently of one another linear (C1-C7) alkyl, preferably linear (C1-C5) alkyl, more specifically linear (C1-C3) alkyl, and for example, methyl or ethyl. Specifically, $R_1$ and $R_3$ may be the same and $R_2$ and $R_4$ may be the same, and more specifically, $R_1$ to $R_4$ may be the same.

In addition, in Chemical Formula 1 according to an exemplary embodiment of the present invention, $R_5$ may be branched (C3-C5) alkyl, and for example, $R_5$ may be isopropyl, sec-butyl, isobutyl, tert-butyl, or isopentyl.

The antimony compound represented by Chemical Formula 1 may be, for example, represented by the following Chemical Formula 2:

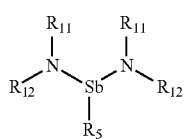

Chemical Formula 2 wherein $R_{11}$ and $R_{12}$ are independently of each other linear or branched (C1-C7) alkyl; and $R_5$ is branched (C3-C7)alkyl.

Specifically, in Chemical Formula 2, $R_{11}$ and $R_{12}$ may be independently of each other linear (C1-C7) alkyl, linear (C1-C5) alkyl, or linear (C1-C3) alkyl, and for example, may be methyl or ethyl. In addition, in Chemical Formula 2, $R_5$ may be for example, isopropyl, sec-butyl, isobutyl, tert-butyl, or isopentyl.

The antimony compound represented by Chemical Formula 1 may be selected from the following compounds, but is not limited thereto:

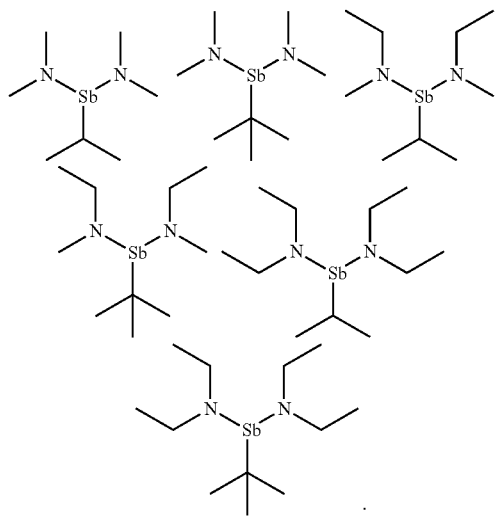

Hereinafter, the method for preparing the antimony compound represented by Chemical Formula 1 will be described in detail, but the antimony compound may be synthesized also by a method which may be recognized by a person skilled in the art, of course, an organic solvent used herein is not limited, and a reaction time and temperature may be also changed within a range not departing from the gist of the invention, of course.

The method for preparing an antimony compound according to an embodiment may include: (A) reacting a compound represented by the following Chemical Formula 11 with compounds represented by the following Chemical Formula 12 and Chemical Formula 13 to produce a trisdialkylamino antimony compound; and (B) reacting the trisdialkylamino antimony compound with a compound represented by the following Chemical Formula 14 or Chemical Formula 15 to prepare the antimony compound of Chemical Formula 1:

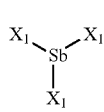

Chemical Formula 11

$M_1(NR_1R_2)$  Chemical Formula 12

$M_1(NR_3R_4)$  Chemical Formula 13

$M_1R_5$  Chemical Formula 14

$R_5-M_2X_2$  Chemical Formula 15 wherein $R_1$ to $R_5$ are as defined above;

$X^1$ and $X^2$ are independently of each other halogen;

$M_1$ is an alkali metal; and

M2 is an alkaline earth metal.

The solvent used in the preparation method according to an embodiment may be a common organic solvent, and may be one or two or more selected from 1,4-dioxane, dichloromethane (DCM), dichloroethane (DCE), toluene, acetonitrile (MeCN), nitromethane, tetrahydrofuran (THF), N,N-dimethylformamide (DMF), N,N-dimethylacetamide (DMA), ether, n-hexane, and chlorobenzene (CB), but is not limited thereto.

The step (A) according to an embodiment may be performed at −20 to 0° C. for 1 hour to 10 hours, specifically −10 to 0° C. for 1 to 5 hours, but is not limited thereto, and may be changed depending on the reaction material, the kind of solvent, and the amount of use. In addition, as an example, in Chemical Formulae 13 and 14, $M_1$ may be Li.

The step (B) according to an embodiment may be performed at −30 to 0° C. for 1 hour to 10 hours, specifically −20 to −10° C. for 1 to 5 hours, but is not limited thereto, and may be changed depending on the reaction material, the kind of solvent, and the amount of use. In addition, as an example, in Chemical Formula 15, M2 may be Mg.

Hereinafter, the exemplary embodiments described above will be described in detail through the following examples. However, the following examples are only for description, and do not limit the right scope.

Hereinafter, the physical properties of the examples were measured as follows:

1) Thickness

An ellipsometer (OPTI-PROBE 2600, THERMA-WAVE) was used to measure the thickness of an antimony-containing thin film.

2) Thermal decomposition temperature ($T_d$)

A thermogravimetric analysis (TGA) method was used. The TGA method was performed by injecting a nitrogen gas at a pressure of 1.5 bar/min while heating a sample to be analyzed to 500° C. at a speed of 10° C./min.

PREPARATION EXAMPLE 1

Preparation of t-butylbis(dimethylamino)antimony

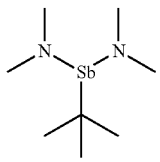

169 ml (0.41 mol) of n-butyllithium (2.3 M solution in n-hexane) was added to a 500 mL flask, 300 ml of n-hexane was added thereto, and stirring was performed. 19 g (0.41 mol) of dimethylamine was slowly added while the internal temperature of the mixture was maintained at −10° C., and then stirring was performed at room temperature (25° C.) for 2 hours, to synthesize lithium(dimethylamine).

30 g (0.13 mol) of antimony trichloride (SbCl₃) was added to a 1 L flask, 300 ml of ether was added thereto, and stirring was performed while the internal temperature was maintained at −10° C. 21 g of lithium (dimethylamine) prepared was slowly added to the flask, and stirring was performed at room temperature for 4 hours, to synthesize trisdimethylaminoantimony. After synthesis, lithium chloride (LiCl) was removed through a filter, the solvent was removed under vacuum, 300 mL of hexane was added, and stirring was performed while the internal temperature was maintained at −20° C.

65 ml (0.13 mol) of t-butylmagnesium chloride (2.0 M solution in ether) was slowly added to the flask while the internal temperature was maintained at −20° C., and stirring was performed at room temperature for 4 hours. After completing the reaction, the solvent and a by-product were removed under reduced pressure. Thereafter, purification was performed at a temperature of 30° C. under a pressure of 0.4 torr to synthesize 15 g of t-butylbis(dimethylamino)antimony.

¹H-NMR(C6D6): δ 2.78(s, 12H), δ 1.19(s, 9H)

PREPARATION EXAMPLE 2

Preparation of isopropylbis(dimethylamino)antimony

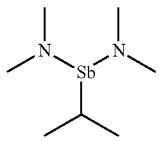

14 g of isopropylbis(dimethylamino)antimony was obtained in the same manner as in Preparation Example 1, except that 186 ml (0.13 mol) of isopropyllithium (0.7M solution in pentane) was used instead of t-butylmagnesium chloride.

¹H NMR (C6D6): δ 2.85(s, 12H), δ 1.80(st, 1H)δ 1.18(d,6H)

FIG. 1 shows results of TGA analysis of t-butylbis(dimethylamino)antimony prepared in Preparation Example 1. Referring to FIG. 1, it was found that the antimony compound of Preparation Example 1 had a single evaporation step at about 120° C., a residue mass at 500° C. was confirmed to be 0.9% to show rapid vaporization characteristics, and 99% or more was vaporized without thermal decomposition. The results show that the antimony compound of Preparation Example 1 had excellent thermal stability.

Figure 2:
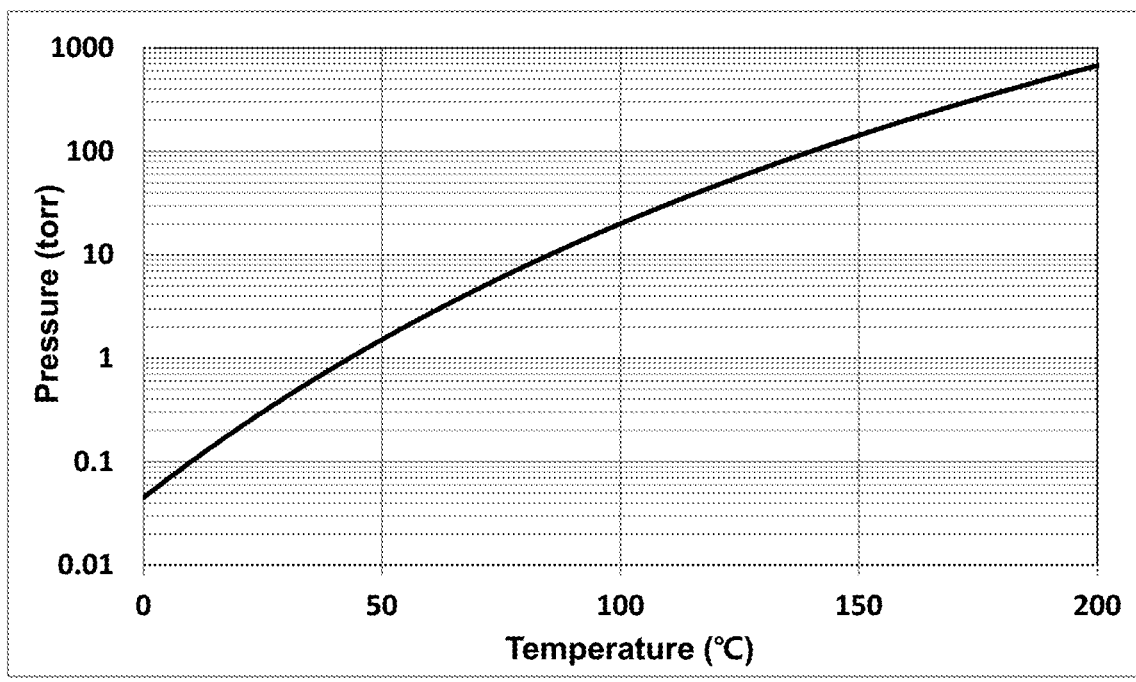
FIG. 2 is results of vapor pressure measurement of t-butylbis(dimethylamino)antimony prepared in Preparation Example 1.

FIG. 2 is results of measuring vapor pressure for confirming the vapor pressure properties of t-butylbis(dimethylamino)antimony prepared in Preparation Example 1.

Figure 3:
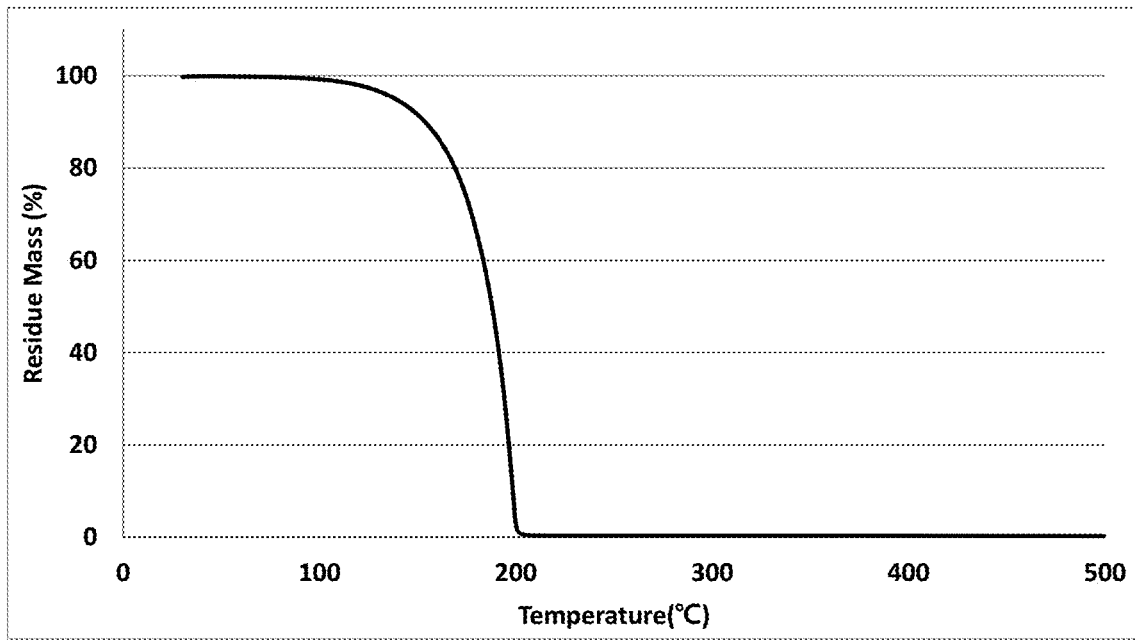
FIG. 3 is results of TGA analysis of isopropylbis(dimethylamino)antimony prepared in Preparation Example 2.

FIG. 3 shows results of TGA analysis of isopropylbis(dimethylamino)antimony prepared in Preparation Example 2. Referring to FIG. 3, it was found that the antimony compound of Preparation Example 2 had a single evaporation step at about 95° C., a residue mass at 500° C. was confirmed to be 0.2% to show rapid vaporization characteristics, and 99% or more was vaporized without thermal decomposition. The results show that the antimony compound of Preparation Example 2 had excellent thermal stability.

Figure 4:
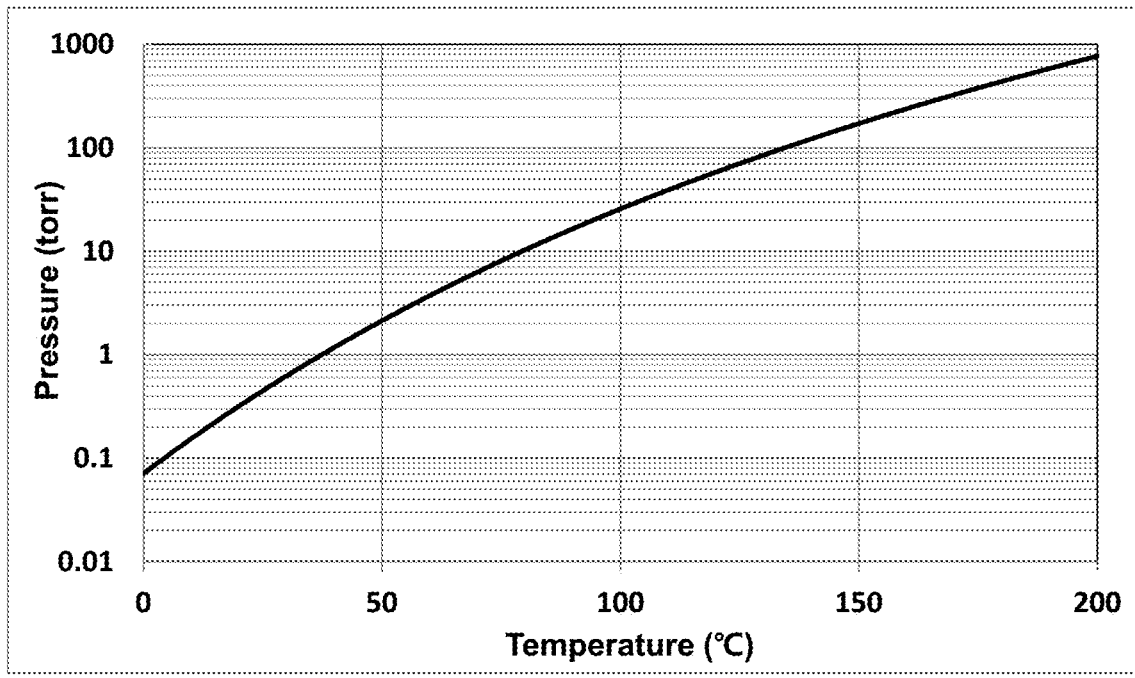
FIG. 4 is results of vapor pressure measurement of isopropylbis(dimethylamino)antimony prepared in Preparation Example 2.

FIG. 4 is results of measuring vapor pressure for confirming the vapor pressure properties of isopropylbis(dimethylamino)antimony prepared in Preparation Example 2.

EXAMPLE 1

An antimony oxide thin film was manufactured by plasma enhanced atomic layer deposition. t-butylbis(dimethylamino)antimony prepared in Preparation Example 1 and isopropylbis(dimetnylamino)antimony prepared in Preparation Example 2 were used, respectively as a precursor, and an oxygen gas was used as a reaction gas.

As a substrate on which an antimony oxide thin film was to be formed, a silicon substrate was used, and the silicon substrate was transferred into a deposition chamber in which the temperature was maintained constantly at the temperature described in the following Table 1.

The temperature of a bubbler type canister made of stainless steel filled with the precursor was maintained, so that the constant vapor pressure of the precursor described in Table 1 was obtained. The vaporized precursor was transferred into the chamber using an argon gas as a transfer gas, and was adsorbed on a silicon substrate. Thereafter, a purge process was performed using an argon gas. A reaction process was performed using an oxygen gas as a reaction gas at a constant plasma power described in the following Table 1. In addition, an argon gas was used to perform a purge process for removing a reaction by-product. An atomic layer deposition process as described above was set as one cycle and an antimony oxide thin film was formed by repeating the certain cycle, and detailed evaluation conditions and results are shown in Table 1.

In addition, the composition of the antimony oxide thin film was analyzed by X-ray photoelectron spectroscopy, and since carbon and nitrogen were not detected, it was confirmed that a pure antimony oxide thin film was obtained.

TABLE 1

| Precursor | Substrate temperature [° C.] | Precursor vapor pressure [Torr] | Precursor injection Argon bubble [sccm] | Time [sec] | Purge Argon [sccm] | Time [sec] | Reaction Oxygen [sccm] | Plasma power [W] | Time [sec] | Purge Argon [sccm] | Time [sec] | Cycle [No.] | Deposition speed [Å/cycle] |
|---|---|---|---|---|---|---|---|---|---|---|---|---|---|
| Preparation Example 1 | Room temperature | 0.5 | 50 | 1 | 600 | 3 | 600 | 400 | 2 | 600 | 3 | 500 | 2.05 |
| | 100 | 0.5 | 50 | 1 | 600 | 3 | 600 | 400 | 2 | 600 | 3 | 500 | 1.86 |
| | 200 | 0.5 | 50 | 1 | 600 | 3 | 600 | 400 | 2 | 600 | 3 | 500 | 1.95 |
| | 400 | 0.5 | 50 | 1 | 600 | 3 | 600 | 400 | 2 | 600 | 3 | 500 | 2.23 |
| | 100 | 0.5 | 50 | 1 | 600 | 3 | 600 | 5 | 2 | 600 | 3 | 500 | 1.72 |
| | 100 | 0.5 | 50 | 1 | 600 | 3 | 600 | 50 | 2 | 600 | 3 | 500 | 1.83 |
| | 100 | 0.5 | 50 | 1 | 600 | 3 | 600 | 100 | 2 | 600 | 3 | 500 | 1.84 |
| | 100 | 0.5 | 50 | 1 | 600 | 3 | 600 | 400 | 2 | 600 | 3 | 500 | 1.86 |
| | 100 | 0.5 | 50 | 1 | 600 | 3 | 600 | 800 | 2 | 600 | 3 | 500 | 1.90 |
| Preparation Example 2 | Room temperature | 0.5 | 50 | 1 | 600 | 3 | 600 | 400 | 2 | 600 | 3 | 500 | 2.14 |
| | 100 | 0.5 | 50 | 1 | 600 | 3 | 600 | 400 | 2 | 600 | 3 | 500 | 1.95 |
| | 200 | 0.5 | 50 | 1 | 600 | 3 | 600 | 400 | 2 | 600 | 3 | 500 | 2.04 |
| | 400 | 0.5 | 50 | 1 | 600 | 3 | 600 | 400 | 2 | 600 | 3 | 500 | 2.29 |
| | 100 | 0.5 | 50 | 1 | 600 | 3 | 600 | 5 | 2 | 600 | 3 | 500 | 1.79 |
| | 100 | 0.5 | 50 | 1 | 600 | 3 | 600 | 50 | 2 | 600 | 3 | 500 | 1.93 |
| | 100 | 0.5 | 50 | 1 | 600 | 3 | 600 | 100 | 2 | 600 | 3 | 500 | 1.92 |
| | 100 | 0.5 | 50 | 1 | 600 | 3 | 600 | 400 | 2 | 600 | 3 | 500 | 1.95 |
| | 100 | 0.5 | 50 | 1 | 600 | 3 | 600 | 800 | 2 | 600 | 3 | 500 | 1.99 |

EXAMPLE 2

An antimony oxide thin film was manufactured by atomic layer deposition. t-butylbis(dimethylamino)antimony prepared in Preparation Example 1 and isopropylbis(dimetnylamino)antimony prepared in Preparation Example 2 were used, respectively as a precursor, and an ozone gas was used as a reaction gas.

As a substrate on which an antimony oxide thin film was to be formed, a silicon substrate was used, and the silicon substrate was transferred into a deposition chamber in which the temperature was maintained at a constant temperature described in the following Table 2.

The temperature of a bubbler type canister made of stainless steel filled with the precursor was maintained, so that the constant vapor pressure of the precursor described in the following Table 2 was obtained. The vaporized precursor was transferred into the chamber using an argon gas as a transfer gas, and was adsorbed on a silicon substrate. Thereafter, an argon gas was used to perform a purge process, and an ozone gas as a reaction gas was used to perform a reaction process. In addition, an argon gas was used to perform a purge process for removing a reaction by-product. An atomic layer deposition process as described above was set as one cycle and an antimony oxide thin film was formed by repeating the certain cycle, and detailed evaluation conditions and results are shown in Table 2.

In addition, the composition of the antimony oxide thin film was analyzed by X-ray photoelectron spectroscopy, and since carbon and nitrogen were not detected, it was confirmed that a pure antimony oxide thin film was obtained.

TABLE 2

| Precursor | Substrate temperature [° C.] | Precursor vapor pressure [Torr] | Precursor injection Argon bubble [sccm] | Time [sec] | Purge Argon [sccm] | Time [sec] | Reaction Ozone [sccm] | Ozone concentration [g/m³] | Time [sec] | Purge Argon [sccm] | Time [sec] | Cycle [No.] | Deposition speed [Å/cycle] |
|---|---|---|---|---|---|---|---|---|---|---|---|---|---|
| Preparation Example 1 | Room temperature | 0.5 | 50 | 1 | 600 | 3 | 600 | 220 | 3 | 600 | 5 | 500 | 2.03 |
| | 100 | 0.5 | 50 | 1 | 600 | 3 | 600 | 220 | 3 | 600 | 5 | 500 | 1.82 |
| | 200 | 0.5 | 50 | 1 | 600 | 3 | 600 | 220 | 3 | 600 | 5 | 500 | 1.92 |
| | 400 | 0.5 | 50 | 1 | 600 | 3 | 600 | 220 | 3 | 600 | 5 | 500 | 2.19 |
| Preparation Example 2 | Room temperature | 0.5 | 50 | 1 | 600 | 3 | 600 | 220 | 3 | 600 | 5 | 500 | 2.10 |
| | 100 | 0.5 | 50 | 1 | 600 | 3 | 600 | 220 | 3 | 600 | 5 | 500 | 1.90 |
| | 200 | 0.5 | 50 | 1 | 600 | 3 | 600 | 220 | 3 | 600 | 5 | 500 | 1.99 |
| | 400 | 0.5 | 50 | 1 | 600 | 3 | 600 | 220 | 3 | 600 | 5 | 500 | 2.23 |

Example 3

An antimony-containing thin film was manufactured by plasma enhanced atomic layer deposition. t-butylbis(dimethylamino)antimony produced in Production Example 1 and isopropylbis(dimetnylamino)antimony produced in Production Example 2 were used, respectively as a precursor, and a carbon dioxide gas was used as a reaction gas.

As a substrate on which an antimony-containing thin film was to be formed, a silicon substrate was used, and the silicon substrate was transferred into a deposition chamber in which the temperature was maintained at a constant temperature described in the following Table 3.

The temperature of a bubbler type canister made of stainless steel filled with the precursor was maintained, so that the constant vapor pressure of the precursor described in the following Table 3 was obtained. The vaporized precursor was transferred into the chamber using an argon gas as a transfer gas, and was adsorbed on a silicon substrate. Thereafter, a purge process was performed using an argon gas. A reaction process was performed using a carbon dioxide gas as a reaction gas at a constant plasma power described in the following Table 3. In addition, an argon gas was used to perform a purge process for removing a reaction by-product. An atomic layer deposition process as described above was set as one cycle and an antimony-containing thin film was formed by repeating the certain cycle, and detailed evaluation conditions and results are shown in Table 3.

In addition, the composition of the antimony-containing thin film was analyzed by X-ray photoelectron spectroscopy, and was confirmed to be a thin film containing 10% or more carbon.

TABLE 3

| Precursor | Substrate temperature [° C.] | Precursor vapor pressure [Torr] | Precursor injection Argon bubble [sccm] | Time [sec] | Purge Argon [sccm] | Time [sec] | Reaction Carbon dioxide [sccm] | Plasma power [W] | Time [sec] | Purge Argon [sccm] | Time [sec] | Cycle [No.] | Deposition speed [Å/cycle] |
|---|---|---|---|---|---|---|---|---|---|---|---|---|---|
| Preparation Example 1 | Room temperature | 0.5 | 50 | 1 | 600 | 3 | 600 | 50 | 2 | 600 | 3 | 500 | 1.02 |
| | 100 | 0.5 | 50 | 1 | 600 | 3 | 600 | 50 | 2 | 600 | 3 | 500 | 0.92 |
| | 200 | 0.5 | 50 | 1 | 600 | 3 | 600 | 50 | 2 | 600 | 3 | 500 | 1.00 |
| | 400 | 0.5 | 50 | 1 | 600 | 3 | 600 | 50 | 2 | 600 | 3 | 500 | 1.25 |
| | 100 | 0.5 | 50 | 1 | 600 | 3 | 600 | 5 | 2 | 600 | 3 | 500 | 0.75 |
| | 100 | 0.5 | 50 | 1 | 600 | 3 | 600 | 50 | 2 | 600 | 3 | 500 | 0.92 |
| | 100 | 0.5 | 50 | 1 | 600 | 3 | 600 | 100 | 2 | 600 | 3 | 500 | 0.94 |
| | 100 | 0.5 | 50 | 1 | 600 | 3 | 600 | 400 | 2 | 600 | 3 | 500 | 0.96 |
| | 100 | 0.5 | 50 | 1 | 600 | 3 | 600 | 800 | 2 | 600 | 3 | 500 | 0.98 |
| Preparation Example 2 | Room temperature | 0.5 | 50 | 1 | 600 | 3 | 600 | 50 | 2 | 600 | 3 | 500 | 1.04 |
| | 100 | 0.5 | 50 | 1 | 600 | 3 | 600 | 50 | 2 | 600 | 3 | 500 | 0.98 |
| | 200 | 0.5 | 50 | 1 | 600 | 3 | 600 | 50 | 2 | 600 | 3 | 500 | 1.03 |
| | 400 | 0.5 | 50 | 1 | 600 | 3 | 600 | 50 | 2 | 600 | 3 | 500 | 1.31 |
| | 100 | 0.5 | 50 | 1 | 600 | 3 | 600 | 5 | 2 | 600 | 3 | 500 | 0.81 |
| | 100 | 0.5 | 50 | 1 | 600 | 3 | 600 | 50 | 2 | 600 | 3 | 500 | 0.98 |
| | 100 | 0.5 | 50 | 1 | 600 | 3 | 600 | 100 | 2 | 600 | 3 | 500 | 1.00 |
| | 100 | 0.5 | 50 | 1 | 600 | 3 | 600 | 400 | 2 | 600 | 3 | 500 | 1.02 |
| | 100 | 0.5 | 50 | 1 | 600 | 3 | 600 | 800 | 2 | 600 | 3 | 500 | 1.04 |

EXAMPLE 4

An antimony-containing thin film was manufactured by chemical vapor deposition. t-butylbis(dimethylamino)antimony prepared in Preparation Example 1 and isopropylbis(dimetnylamino)antimony prepared in Preparation Example 2 were used, respectively as a precursor, and water vapor was used as a reaction gas.

As a substrate on which an antimony-containing thin film was to be formed, a silicon substrate was used, and the silicon substrate was transferred into a deposition chamber in which the temperature was maintained at a constant temperature described in the following Table 4.

The temperature of a bubbler type canister made of stainless steel filled with the precursor was maintained, so that the constant vapor pressure of the precursor described in the following Table 4 was obtained. The vaporized precursor was transferred into the chamber using an argon gas as a transfer gas. In addition, water vapor as the reaction gas was transferred into the chamber by maintaining the temperature of a bubbler type canister made of stainless steel filled with water so that a constant vapor pressure described in the following Table 4 was obtained, and using an argon gas as a transfer gas. In addition, a process pressure was adjusted so that the pressure of the chamber was maintained constantly using a throttle valve. As such, the precursor and the water vapor were used to perform chemical vapor deposition to form an antimony-containing thin film, and the detailed evaluation conditions and results are shown in Table 4.

In addition, the composition of the antimony-containing thin film was analyzed by X-ray photoelectron spectroscopy, and was confirmed to be a thin film containing 10% or more carbon.

TABLE 4

| Precursor | Substrate temperature [° C.] | Precursor Vapor pressure [Torr] | Precursor Argon bubble [sccm] | Water Vapor pressure [Torr] | Water Argon bubble [g/m$^3$] | Transfer gas Argon [sccm] | Process pressure [Torr] | Deposition time [sec] | Deposition speed [Å/sec] |
|---|---|---|---|---|---|---|---|---|---|
| Preparation Example 1 | 70 | 0.2 | 25 | 6 | 10 | 600 | 1 | 600 | 0.75 |
| | 70 | 0.2 | 25 | 6 | 10 | 600 | 2 | 600 | 0.92 |
| | 70 | 0.2 | 25 | 6 | 10 | 600 | 3 | 600 | 0.98 |
| | 25 | 0.2 | 25 | 6 | 10 | 600 | 2 | 600 | 1.93 |
| | 70 | 0.2 | 25 | 6 | 10 | 600 | 2 | 600 | 0.92 |
| | 200 | 0.2 | 25 | 6 | 10 | 600 | 2 | 600 | 0.73 |
| | 400 | 0.2 | 25 | 6 | 10 | 600 | 2 | 600 | 0.83 |
| Preparation Example 2 | 70 | 0.2 | 25 | 6 | 10 | 600 | 1 | 600 | 0.80 |
| | 70 | 0.2 | 25 | 6 | 10 | 600 | 2 | 600 | 1.00 |
| | 70 | 0.2 | 25 | 6 | 10 | 600 | 3 | 600 | 1.02 |
| | 25 | 0.2 | 25 | 6 | 10 | 600 | 2 | 600 | 1.98 |
| | 70 | 0.2 | 25 | 6 | 10 | 600 | 2 | 600 | 1.00 |
| | 200 | 0.2 | 25 | 6 | 10 | 600 | 2 | 600 | 0.75 |
| | 400 | 0.2 | 25 | 6 | 10 | 600 | 2 | 600 | 0.85 |

Patterning of Antimony-Containing Thin Film

EXAMPLE 5

The antimony-containing thin film manufactured in Example 3 was used to perform patterning of the antimony-containing thin film.

In order to form a 1:1 line-space feature at a pitch of 24 nm, in extreme ultraviolet (EUV) lithography equipment, EUV was used with an exposure of about 76 mJ/cm$^2$ to perform patterning. Subsequently, firing was performed at about 150° C. for 3 minutes, development was performed in 2-heptanone for about 15 seconds, and rinsing was performed with the same solvent.

Figure 5A:
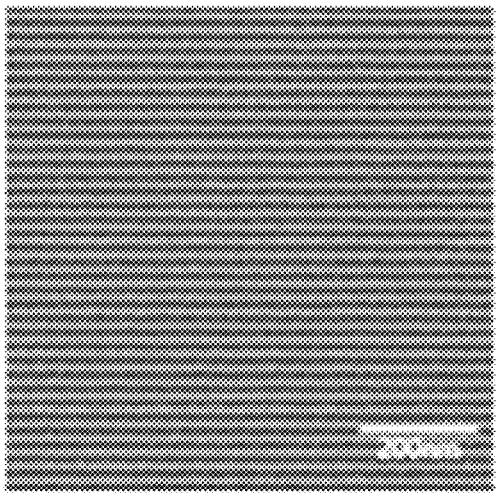
FIGS. 5A-5B are scanning electron microscopic image photographs of a line/space pattern formed on a silicon substrate using the antimony compound prepared in Preparation Examples 1 and 2.
Figure 5B:
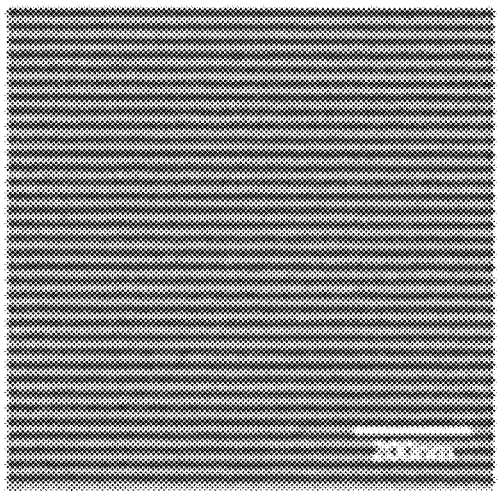

FIGS. 5A-5B are scanning electron microscopic images of a line/space pattern formed on a silicon substrate with pitches of 24 nm. FIG. 5A is an image of pattern using t-butylbis(dimethylamino)antimony of Preparation Example 1, and FIG. 5B is an image of pattern using isopropylbis(dimethylamino)antimony of Preparation Example 2.

As seen from the pattern images, it was confirmed that a line/space pattern of 1:1 was evenly formed even in a narrow pitch of 24 nm.

The composition for forming an antimony-containing thin film according to an embodiment of the present invention may be easily stored and handled, allows deposition of a thin film with a high thin film deposition rate even at low temperature conditions, and may produce a high-quality antimony-containing thin film in a high purity.

In addition, the composition for forming an antimony-containing thin film according to an embodiment of the present invention may produce a high-quality thin film in a high yield, and thus, may be usefully applied to various industrial fields.

In particular, the antimony compound of the present invention has excellent light absorption rate and light emission effect to EUV, and thus, may be very useful as a hard mask used in an EUV photolithography process.

The invention claimed is:

1. A composition for depositing an antimony-containing thin film comprising:
    an antimony compound represented by the following Chemical Formula 1:

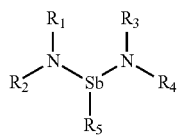

Chemical Formula 1 wherein
    $R_1$ to $R_4$ are independently of one another linear or branched (C1-C7) alkyl; and
    $R_5$ is branched (C3-C7) alkyl.

2. The composition for depositing an antimony-containing thin film of claim 1, wherein in Chemical Formula 1, $R_1$ to $R_4$ are independently of one another linear (C1-C7) alkyl.

3. The composition for depositing an antimony-containing thin film of claim 1, wherein $R_5$ is branched (C3-C5) alkyl.

4. The composition for depositing an antimony-containing thin film of claim 1, wherein the antimony compound is selected from the following compounds:

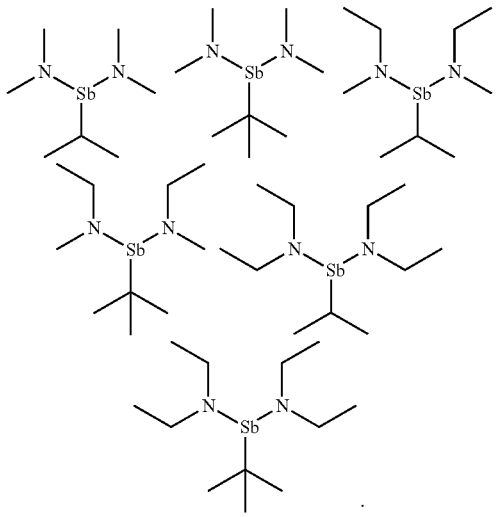

5. A method for manufacturing an antimony-containing thin film, comprising reacting a reaction gas with an antimony compound represented by the following Chemical Formula 1:

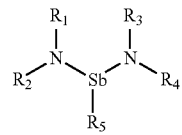

Chemical Formula 1 wherein $R_1$ to $R_5$ are independently of one another linear or branched (C1-C7) alkyl.

6. The method for manufacturing an antimony-containing thin film of claim 5, wherein in Chemical Formula 1, $R_1$ to $R_4$ are independently of one another linear (C1-C7) alkyl, and $R_5$ is branched (C3-C7) alkyl.

7. The method for manufacturing an antimony-containing thin film of claim 5, wherein the antimony compound represented by Chemical Formula 1 is represented by the following Chemical Formula 2:

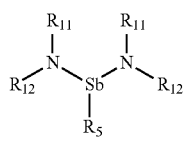

Chemical Formula 2 wherein
    $R_{11}$ and $R_{12}$ are independently of each other linear or branched (C1-C7) alkyl; and
    $R_5$ is branched (C3-C7) alkyl.

8. The method for manufacturing an antimony-containing thin film of claim 7, wherein $R_5$ is branched (C3-C5) alkyl.

9. The method for manufacturing an antimony-containing thin film of claim 5, wherein the antimony compound is selected from the following compounds:

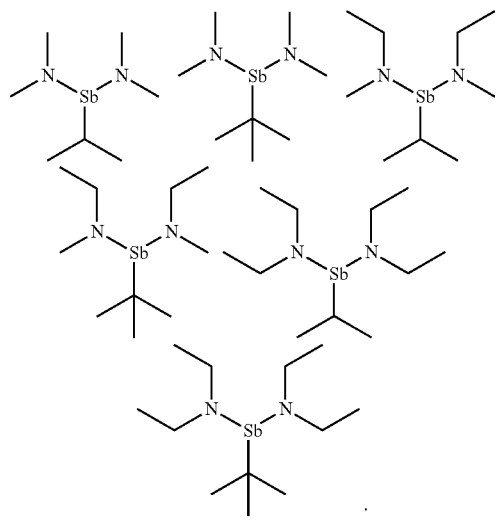

10. The method for manufacturing an antimony-containing thin film of claim 5, wherein the method includes:
    a) maintaining a temperature of a substrate mounted in a chamber at 30 to 500° C.;
    b) bringing the substrate into contact with the composition for depositing an antimony-containing thin film of claim 1 to adsorb the composition onto the substrate; and c) injecting a reaction gas into the substrate onto which the composition for depositing an antimony-containing thin film is adsorbed to form an antimony-containing thin film.

11. The method for manufacturing an antimony-containing thin film of claim 10, wherein the reaction gas includes oxygen ($O_2$), ozone ($O_3$), oxygen plasma, hydrogen ($H_2$), hydrogen plasma, water ($H_2O$), hydrogen peroxide ($H_2O_2$), nitrogen dioxide ($NO_2$), nitrogen monoxide (NO), nitrous oxide ($N_2O$), ammonia ($NH_3$), carbon dioxide ($CO_2$), formic acid (HCOOH), acetic acid ($CH_3COOH$), anhydrous acetic acid (($CH_3CO_2O$), or a combination thereof.

12. The method for manufacturing an antimony-containing thin film of claim 10, wherein the reaction gas is supplied after being activated by generating plasma at 50 to 1,000 W.

13. An antimony compound represented by the following Chemical Formula 1:

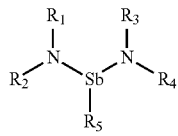

Chemical Formula 1 wherein $R_1$ to $R_4$ are independently of one another linear or branched (C1-C7) alkyl; and $R_5$ is branched (C3-C7) alkyl.

14. The antimony compound of claim 13, wherein $R_5$ is branched (C3-C5) alkyl.

* * * * *